United States Patent [19]

Ishikawa et al.

[11] 4,412,112
[45] Oct. 25, 1983

[54] DRAWER-TYPE CIRCUIT BREAKER

[75] Inventors: Takayoshi Ishikawa; Yasushi Genba; Shigemi Tamaru; Kiyoshi Eguchi, all of Hiroshima, Japan

[73] Assignee: Mitsubishi Denki Kabushiki Kaisha, Hiroshima, Japan

[21] Appl. No.: 368,065

[22] Filed: Apr. 13, 1982

[30] Foreign Application Priority Data

Apr. 14, 1981 [JP] Japan .............................. 56-54081[U]
Apr. 14, 1981 [JP] Japan .............................. 56-54082[U]

[51] Int. Cl.³ ............................................. H01H 9/20
[52] U.S. Cl. ............................... 200/50 AA; 361/338; 361/391
[58] Field of Search .................. 200/50 AA; 361/338, 361/339, 391

[56] References Cited

U.S. PATENT DOCUMENTS 2,711,452 6/1955 Spencer et al. ............... 200/50 AA
2,777,024 6/1957 West .............................. 200/50 AA
3,235,681 2/1966 Pokorny et al. ............... 200/50 AA Primary Examiner—A. T. Grimley
Assistant Examiner—Morris Ginsburg
Attorney, Agent, or Firm—Sughrue, Mion, Zinn, Macpeak and Seas

[57] ABSTRACT

A drawer-type circuit breaker of the type adapted to be disposed in an engaged and disengaged position within a housing and a disengaged position outside the housing on extendable support rails is provided with latches which will prevent the extension of the guide rails until the circuit breaker is moved from the engaged position to the disengaged position within the housing. The movement of the circuit breaker to the disengaged position operates the latches to permit extension of the support rails while still preventing movement of the circuit breaker onto the support rails. Movement of the support rails to the fully extended position allows the latches to be released by movement of the circuit breaker to allow the circuit breaker to be withdrawn out of the housing onto the support rails. Actuating levers for engaging and disengaging the circuit breaker are provided on opposite sides of the circuit breaker for movement in respective slots and notches to smoothly and efficiently carry out the engaging and disengaging operation while preventing undesirable vertical movement of the circuit breaker relative to the housing.

1 Claim, 18 Drawing Figures

FIG. 13
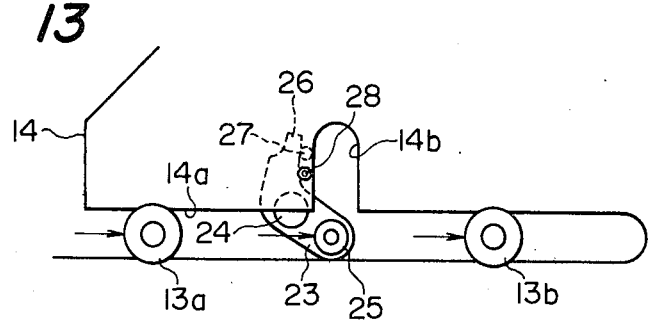
FIG. 14 PRIOR ART
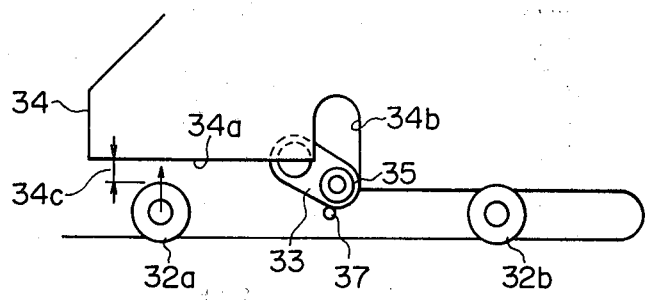
FIG. 15 PRIOR ART
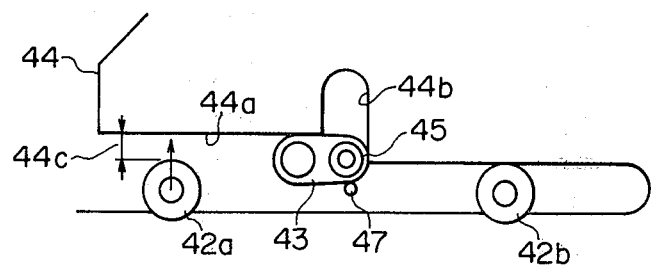
FIG. 16  FIG. 17  FIG. 18
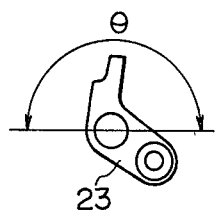 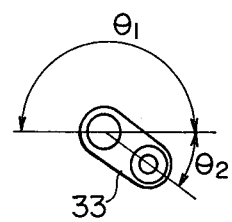 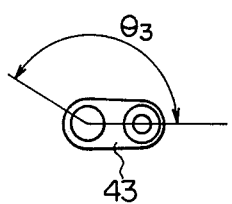

DRAWER-TYPE CIRCUIT BREAKER

BACKGROUND OF THE INVENTION

The present invention is directed to a drawer-type circuit breaker and more particularly to a latching arrangement associated with the extendable support rails for supporting a circuit breaker body in a disconnected position and a lever arrangement associated with the movable circuit breaker for initiating the disconnecting of the circuit breaker during a drawing operation and for making the final connection during an insertion operation.

Japanese Utility Model publication No. 50-25460 published July 31, 1975 discloses a drawer-type circuit breaker wherein the circuit breaker 2 is supported for rolling movement on at least one support rail 6. A latch lever 8 is pivoted to the support rail 6 and is normally biased for engagement by a stop member 11 on the circuit breaker 2 by means of a spring 10 to prevent withdrawal of the circuit breaker from the housing. An extension rail 7 is provided with a projection 15 which allows the extension rail 7 to be supported in alignment with the support rail 6 by means of pins 12 and 13 on the support rail 6. When the extension rail is secured in place a protrusion 13a on the end of the projection engages the latch lever 8 to bias the same out of blocking position relative to the stop member 11 against the force of the spring 10 thereby allowing the circuit breaker 2 to roll outwardly from the housing onto the extension rail 7. When not in use the extension rail 7 is completely disconnected from the circuit breaker assembly and is therefore susceptible to being misplaced and therefore unavailable when needed.

The U.S. patent to Powell No. 3,663,773 granted May 16, 1972 is directed to a switch gear draw-out apparatus with a clutch interlock. A pair of support rails are pivotally mounted on the circuit breaker housing on opposite sides of the circuit breaker for movement between a vertical stored position and a horizontal operative position for supporting the circuit breaker on rollers during a drawing operation. A manually operated lever is also pivotally mounted on one side of the circuit breaker housing for controlling the movement of a cam which in turn controls the initial disconnecting movement of the circuit breaker during withdrawal and the final connection of the circuit breaker upon insertion thereof. A clutch is operatively associated with the lever and cam to prevent the operation of the cam when the circuit breaker contacts are in the closed position. In addition to requiring a complex assembly of springs and levers to operatively clutch and unclutch the lever to the cam member, a reverse movement must be applied to the lever after the initial disconnecting movement to unlatch the circuit breaker from the housing to permit the same to be drawn outwardly onto the support rails.

SUMMARY OF THE INVENTION

The present invention provides a new and improved drawer-type circuit breaker having an extendable and retractable support rail system and associated latch means which prevents the support rails from being extended until the circuit breaker is disconnected and then subsequently prevents movement of the circuit breaker outwardly on the support rails until said support rails have been fully extended.

The present invention provides a new and improved drawer-type circuit breaker having a lever actuator system which substantially eliminates all undesirable vertical movement of the circuit breaker during drawing or inserting of the circuit breaker while substantially reducing the force required to connect and disconnect the circuit breaker.

The present invention provides a new and improved drawer-type circuit breaker comprising a housing having a pair of horizontally disposed guide slots and a pair of vertically extending notches intersecting said slots respectively, a circuit breaker having roller means thereon extending into said slot in engagement with the edges thereof for supporting said breaker in said housing, an actuating lever pivotally mounted on each side of said circuit breaker for pivotal movement on a horizontal axis, guide roller means projecting from one end of said lever for travel along said slot and intersecting notch, first stop means on said breaker engagable by the opposite end of said actuating lever for locating said roller in said slot for movement along said slot during withdrawal or insertion of said breaker in said housing, second stop means on said housing adapted to engage said actuating lever during insertion of said breaker to align said roller means with said notch so that upon pivoting said actuating lever said roller means will enter said notch to move said circuit breaker further into said housing and third stop means engageable by said lever to limit pivotal movement thereof and maintain said roller means in said notch in the final inserted position.

The present invention provides a new and improved drawer-type circuit breaker comprising a fixed housing having a pair of side walls with horizontally disposed slots therein, a circuit breaker movably mounted within said housing and having roller means extending into said slots in engagement with the edges thereof for movably supporting said circuit breaker, support rail means slidably mounted on said housing means for horizontal sliding movement parallel to said slot with the upper edge thereof in engagement with said roller means, said support rail means having a notch in the lower edge thereof adjacent a forward end thereof and a chamfer on the bottom edge at the rear end thereof, latch means pivotally mounted on said housing, spring means biasing said latch means into engagement with said notch to prevent withdrawal of said support rail means when said circuit breaker is fully engaged within said housing, said latch means having one end portion protruding above the upper edge of said rail means for engagement by said roller means upon disengagement of said circuit breaker and flange means extending laterally from the other end of said latch means under said rail means so that upon engagement of said one end of said latch means by said roller means said latch means will pivot out of said notch to bring said flange into engagement with the bottom edge of said rail means to allow withdrawal of said rail while preventing movement of said roller means past said latch means until said support rail means is extended to bring said chamfer adjacent said flange to permit further pivotal movement of said latch means to allow said circuit breaker to be drawn outwardly onto said support rail means.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 13 is a view similar to FIG. 10 showing the relationship of the actuating lever and operating roller relative to the slot and notch during the insertion of the circuit breaker according to the present invention.

FIG. 14 is a view similar to FIG. 13 showing the actuating lever and roller arrangement in one type of prior art circuit breaker.

FIG. 15 is a view similar to FIG. 13 showing the actuating lever and roller for another type of prior art circuit breaker.

FIG. 16 is a schematic view showing the operating angle for the circuit breaker actuating lever of FIG. 13.

FIG. 17 is a schematic diagram showing the operating angles for the prior art actuating lever of FIG. 14.

FIG. 18 is a schematic view showing the operating angle for the prior art actuating lever of FIG. 15.

DETAILED DESCRIPTION OF THE INVENTION

Figure 1:
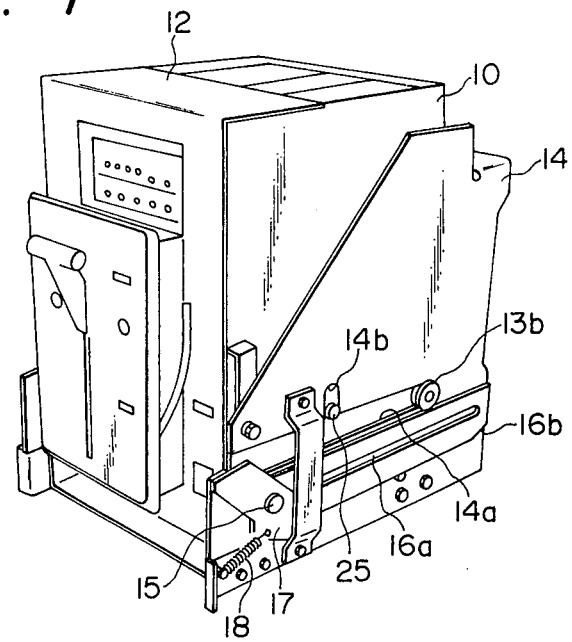
FIG. 1 is a perspective view of a circuit breaker in the fully engaged position in a housing.

The drawer-type circuit breaker device according to the present invention is comprised of a circuit breaker assembly 12 carried by a frame 10 which in turn is movably mounted within a fixed frame 14. Identical support means, latch means and operating means are provided on opposite sides of the circuit breaker assembly but will only be described with respect to the side of the circuit breaker assembly visible in the drawings. The support means is comprised of a pair of rollers 13a and 13b mounted on the side of the movable frame 10 of the circuit breaker assembly and an elongated horizontal slot 14a formed in the side of the fixed frame 14. The forward end of the slot 14a is open to allow the circuit breaker assembly to be completely withdrawn from the fixed frame 14 and a vertically extending notch 14b intersects the slot 14a to accommodate an actuating roller 25 as will be described in greater detail hereinafter. The rollers 13a and 13b are grooved and ride on the lower surface of the slot 14a. The upper edge of the slot 14a extends within the grooves on the rollers with limited clearance so as to reduce the vertical movement of the circuit breaker assembly relative to the fixed frame to a minimum while providing for ease of horizontal movement.

Figure 2:
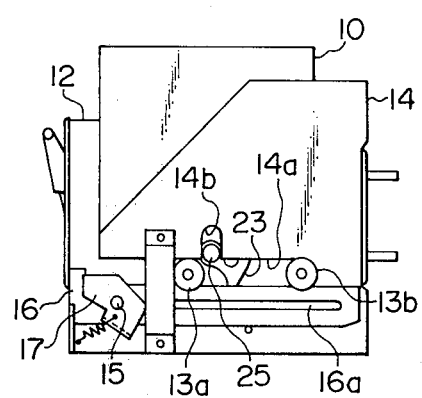
FIG. 2 is a side elevation view of the circuit breaker in the fully engaged position within the housing and the support rails latched in retracted position.
Figure 5:
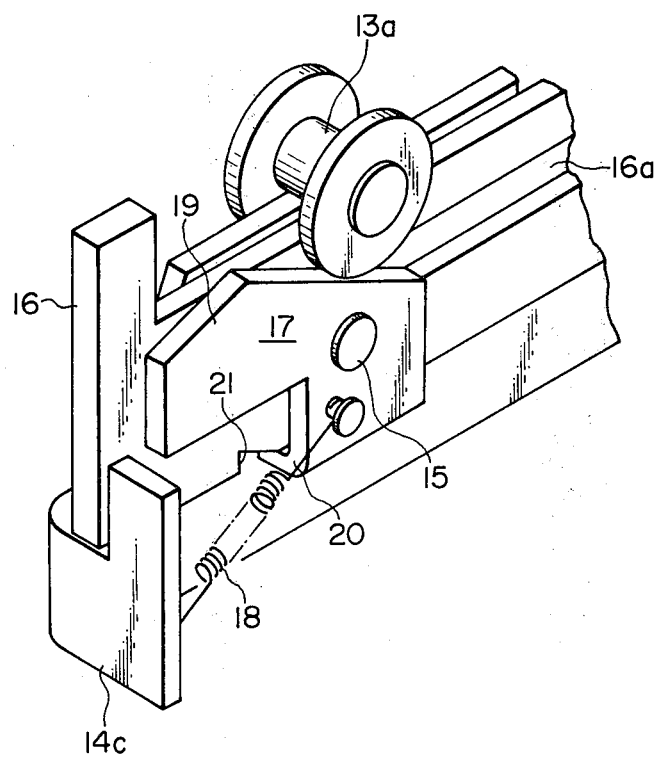
FIG. 5 is an enlarged perspective view of the outer end of a support rail and the latch means associated therewith.
Figure 6:
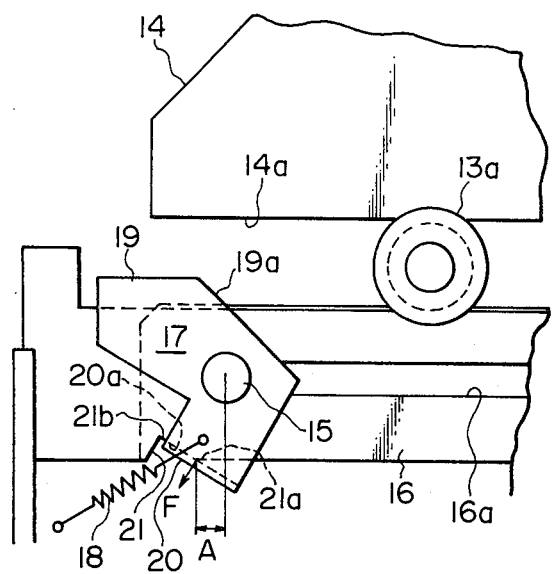
FIG. 6 is an enlarged side elevation view of the arrangement shown in FIG. 5 with the circuit breaker in the fully engaged position and the latch means preventing withdrawal of the support rail.

An extendable support rail 16 is movably mounted on the outside of the side wall of the fixed frame 14 by means of a headed pin 15 secured to the sides of the fixed frame 14 and located in an elongated closed horizontal slot 16a. When the support rail 16 is in its retracted position as shown in FIG. 2, the inner end of the support rail 16 will be supported by the pin 15 extending outwardly from the side of the fixed frame 14. The upper edge of the support rail 16 is coincident with the lower edge of the slot 14a so that the rollers 13a and 13b also rest in rolling engagement on the upper edge of the support rail 16. The lower forward edge of the fixed frame 14 is bent outwardly at 14c as best seen in FIG. 5 so as to provide an additional sliding support for the support rail 16. The lower edge of the support rail 16 is provided with a triangular notch 21 adjacent the forward end of the slot 16a as best seen in FIG. 6. When the support rail 16 is in the completely retracted position as shown in FIG. 6 the rearward end 21a of the notch 21 is spaced forwardly a distance A from the center of the pin 15. A latch member 17 is pivotally mounted on the pin 15 outwardly of the support rail 16. One arm 19 of the latch lever 17 extends above the lower edge of the slot 14a when the latch lever is in the latching position shown in FIG. 6 and is provided with a slopping surface 19a which is adapted to be engaged by the roller 13a upon disconnecting the circuit breaker assembly. The other arm of the latch lever 17 is provided with a laterally extending flange 20 which is adapted to extend beneath the support rail 16. The latch lever 17 is biased in the clockwise direction by a spring 18 connected between the lever 17 and the fixed frame 14.

Figure 3:
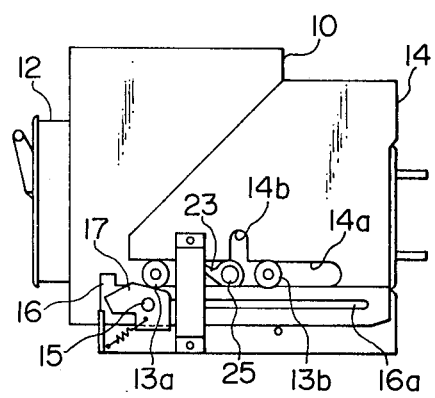
FIG. 3 is a side elevation view similar to FIG. 1 showing the circuit breaker in the disengaged position within the housing with the support rails still retracted but unlatched.
Figure 4:
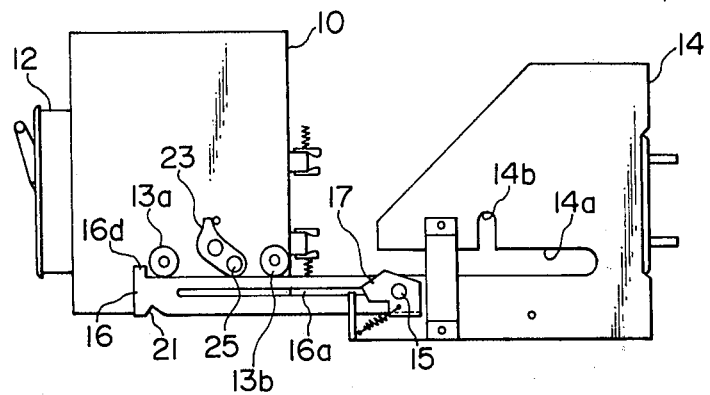
FIG. 4 is a side elevation view of the circuit breaker with the support rails fully extended and the circuit breaker fully removed from said housing on said support rails.
Figure 7:
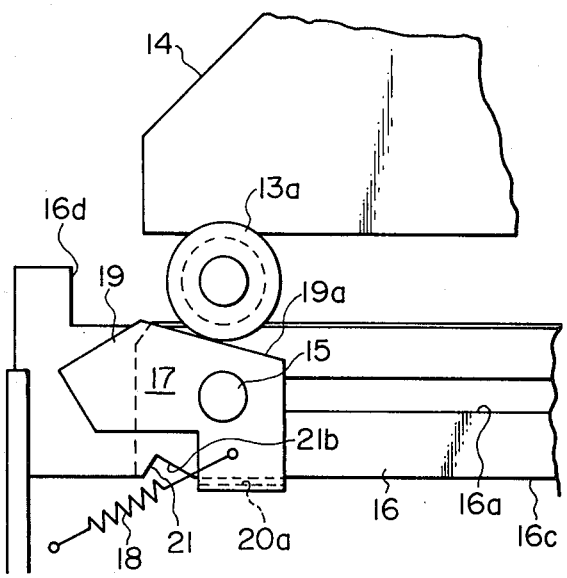
FIG. 7 is a view similar to FIG. 6 with the circuit breaker disengaged and the latch means in position to allow extension of the support rail while preventing removal of said circuit breaker from the housing.
Figure 8:
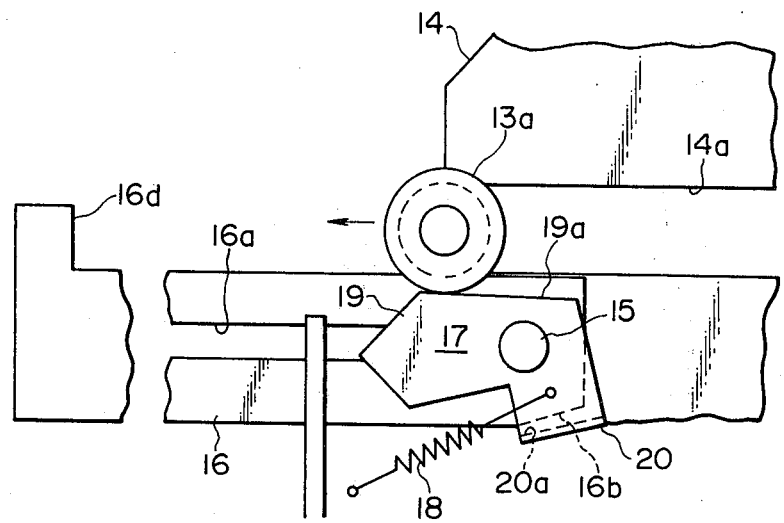
FIG. 8 is a view similar to FIG. 7 showing the rail in the fully extended position and the latch in a position to allow withdrawal of the circuit breaker from the housing onto the support rails.
Figure 9:
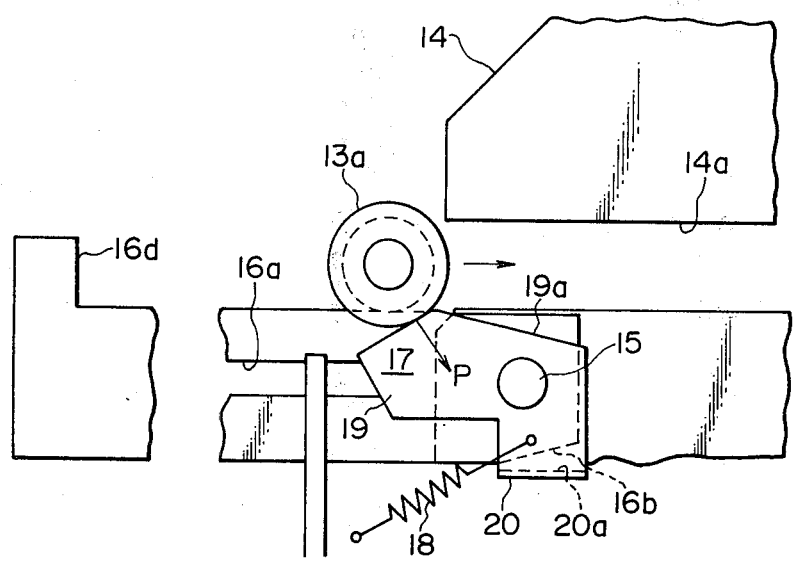
FIG. 9 is a view similar to FIG. 8 showing the relationship of the roller and latch to permit insertion of the circuit breaker.

In operation, the latch lever 17 is normally biased by the spring 18 into the position shown in FIGS. 1, 2 and 6 when the circuit breaker assembly is fully inserted into the fixed frame 14 and the support rails 16 are fully retracted. In this position, the upper surface 20a of the flange 20 on the latch lever 17 will engage the surface 21b of the notch 21 in the bottom edge of the support rail 16 with a force indicated by the arrow F. Therefore, the support rails 16 will be prevented from being moved horizontally into an extended position. Upon disconnection of the circuit breaker assembly, by means to be described hereinafter, the roller 13a will move into engagement with the latch lever 17 as shown in FIGS. 3 and 7 to pivot the latch lever 17 against the force of the spring 18. The upper surface 20a of the flange 20 of the latch lever 17 will then come into engagement with the horizontal bottom edge of the guide rail 16 to prevent further pivotal movement. Therefore, the arm 19 of the latch lever 17 will still be in position to prevent further withdrawal of the circuit breaker assembly due to engagement of the roller 13a with the edge 19a of the latch lever 17. Since the latch no longer engages the notch 21 in the guide rail 16, the guide rails 16 may be extended to the positions shown in FIGS. 4, 8 and 9. Once the guide rails 16 are extended to their outermost position as determined by the length of the slot 16a, the chamfered surface 16b on the lower rear edge of the rail 16 will be disposed next to the flange 20 on the latch lever 17. Thus, the outward movement of the circuit breaker assembly will now be permitted and the roller 13a will pivot the latch lever 17 in a counterclockwise direction as seen in FIG. 8. The circuit breaker assembly can then be withdrawn from the fixed housing 14 to the extent shown in FIG. 4 wherein the roller 13a will engage the upstanding stop 16d at the end of the guide rail 16. When it is desired to reinsert the circuit breaker assembly into the fixed housing 14, the circuit breaker assembly will be moved in the direction of the arrow in FIG. 9 and the rollers 13a and 13b will sequentially engage the latch lever 17 with a force indicated by the arrow P to force the latch lever in the counterclockwise direction thereby permitting passage of the rollers from the extended support rails into the slots 14a in the sides of the fixed housing 14.

Figure 10:
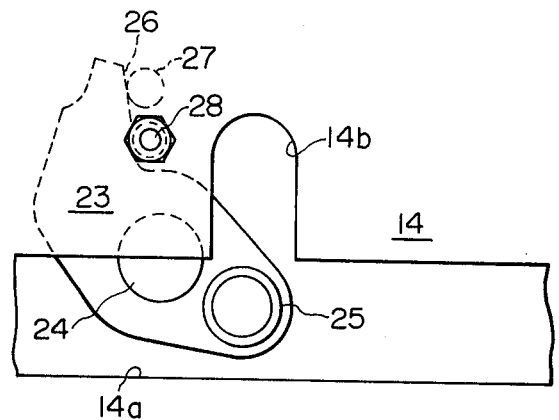
FIG. 10 is a partial side elevation view showing the actuating lever in engagement with the stops just prior to the initiation of the circuit breaker engaging movement.
Figure 11:
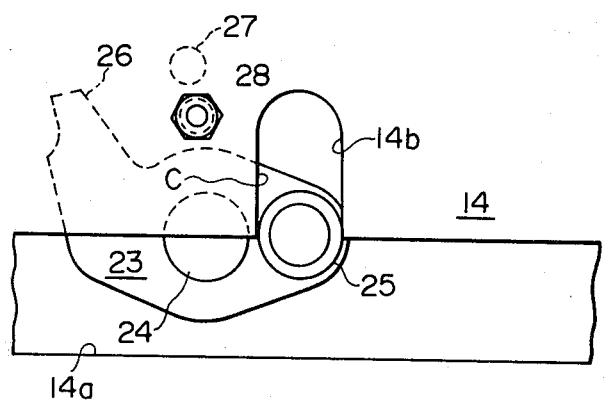
FIG. 11 is a view similar to FIG. 10 with the actuating lever initiating the engagement of the circuit breaker.
Figure 12:
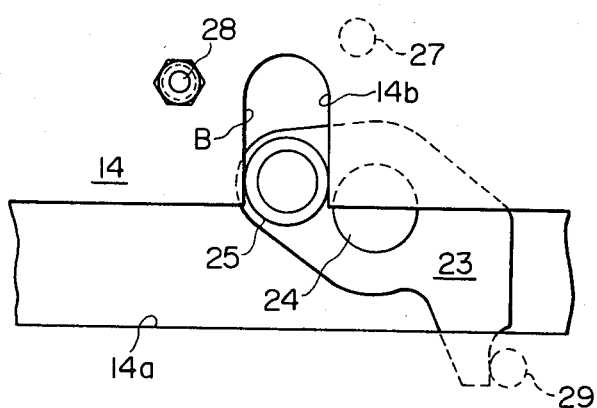
FIG. 12 is a view similar to FIG. 11 showing the position of the actuating lever with the circuit breaker in the fully engaged position.

In order to engage and disengage the contacts of the circuit breaker assembly as it moves into and out of the fully inserted position, power operated actuating levers 23 are pivotally mounted at 24 on opposite sides of the movable frame 10 of the circuit breaker assembly. The construction and sequential operation of the actuating levers 23 is best seen in FIGS. 10-12 wherein each lever is provided with a laterally extending guide roller 25 on one end thereof and a stop engaging extension 26 at the other end thereof on the opposite side of the pivot 24 from the roller 25. During the movement of the circuit breaker assembly outwardly of the fixed housing 14 onto the support rails 16 the roller 25 is normally positioned by engagement of the extension 26 with a stop pin 27 on the circuit breaker assembly so as to travel within the slot 14a without engaging the sides thereof. During an insertion operation the circuit breaker assembly will reach the position shown in FIG. 3 wherein the roller 25 will be substantially positioned in alignment with the elongated notch 14b as determined by the engagement of the extension 26 of the actuating lever 23 with the stop pin 28 secured to the fixed housing 14. From this position, the inserting operation is carried out by turning the actuating lever 23 in the counterclockwise direction by means of a worm gear-type drive assembly (not shown). The counterclockwise rotation of the actuating lever 23 will bring the roller 25 into engagement with the elongated notch 14b as shown in FIG. 11. Continued rotation of the actuating lever 23 until it engages the stop pin 29 on the fixed housing 14 as shown in FIG. 12 will draw the circuit breaker assembly fully into the fixed housing 14 to bring about engagement of the circuit breaker contacts. While the pivot pin continues to move in a straight horizontal line from the position in FIG. 11 to the position in FIG. 12, the roller 25 will move up and down within the elongated slot 14a. In order to disengage the contacts of the circuit breaker assembly, the actuating lever 23 is rotated in the opposite or clockwise direction thereby moving the circuit breaker assembly from the position shown in FIG. 2 to the position shown in FIG. 3. Then, upon extension of the support rails 16 the circuit breaker assembly can be completely withdrawn from the fixed housing 14 in the manner described above.

The advantage of the actuating lever arrangement according to the present invention over two different types of prior art actuating lever assemblies can best be seen from FIGS. 13-18. According to the present invention the actuating lever assembly 23 as illustrated in FIG. 13 has an effective rotational angle indicated at $\theta$ as illustrated in FIG. 16. According to a first prior art construction shown in FIG. 14, the actuating lever 33 is normally maintained in the illustrated position by a stop pin 37 during the withdrawal and insertion of the circuit breaker assembly. Thus, the slot 34a in which the rollers 32a and 32b on the circuit breaker assembly move, must be substantially wider at the outer end by a distance indicated at 34c in FIG. 14. Such excessive clearance for the guide roller 32a leads to an unstable arrangement for the circuit breaker assembly which will allow undesirable vertical movement of the circuit breaker assembly. Also, even though the actuating lever can utilize a full rotational angle $\theta_1$ as seen in FIG. 17 similar to the angle $\theta$ for the latch lever according to the present invention, the movement of the actuating lever 33 through the angle $\theta_2$ in FIG. 17 will cause an undesirable movement of the circuit breaker assembly in the drawing direction which is opposite to the desired direction. Such a movement in the drawing direction could possibly interfere with a latch assembly for preventing complete withdrawal of the circuit breaker assembly.

In the prior art embodiments shown in FIG. 15 the actuating lever 43 is normally maintained in a horizontal position by a stop pin 47. As in the previous prior art embodiment, the guide slot 44a must be substantially wider as indicated by the distance 44c thus leading to the undesirable instability discussed above. Furthermore, the operating angle $\theta_3$ is considerably shorter than the operating angle according to the present invention.

While the invention has been particularly shown and described with reference to a preferred embodiment thereof, it will be understood by those in the art that various changes in form and details may be made therein without departing from the spirit and scope of the invention.

We claim:

1. A drawer-type circuit breaker comprising a housing having a pair of horizontally disposed guide slots and a pair of vertically extending notches intersecting said slots respectively, circuit breaker means having roller means thereon extending into said slots in engagement with the edges thereof for supporting said circuit breaker means in said housing, an actuating lever pivotally mounted on each side of said circuit breaker means for pivotal movement on a horizontal axis, a guide roller projecting from one end of each lever for travel along a respective one of said slots and intersecting notches, first stop means on said breaker means engagable by the opposite ends of said actuating levers for locating said guide rollers in said slots for movement along said slots during withdrawal or insertion of said breaker means in said housing, second stop means on said housing adapted to engage each actuating lever during insertion of said breaker means to align each guide roller with each notch so that upon pivoting each lever said guide roller thereon will enter a respective notch to move said circuit breaker means further into said housing and third stop means engagable by each lever to limit pivotal movement thereof and maintain each guide roller in a respective notch in the final inserted position.

* * * * *